J. MYERS.
Cultivator.

No. 11,528.  Patented Aug. 15, 1854.

UNITED STATES PATENT OFFICE.

JACOB MYERS, OF POWHATAN POINT, OHIO.

IMPROVEMENT IN HARROWS.

Specification forming part of Letters Patent No. 11,528, dated August 15, 1854.

*To all whom it may concern:*

Be it known that I, JACOB MYERS, of Powhatan Point, in the county of Belmont and State of Ohio, have invented a new and Improved Side Harrow; and I do hereby declare that the following is a full, clear, and exact description of the construction and operation of the same, reference being had to the annexed drawings, forming part of this specification, in which—

Figure 1:
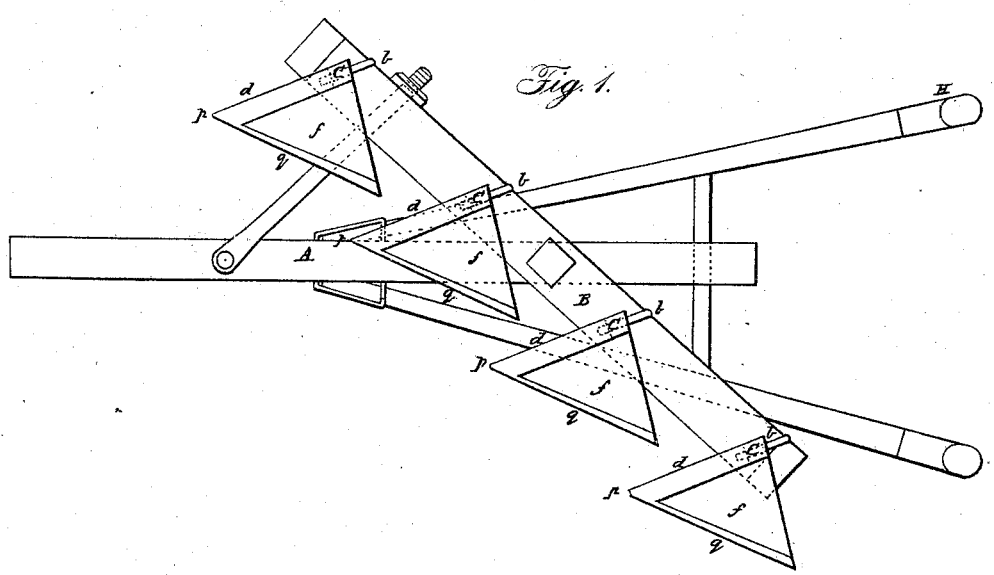
Figure 2:
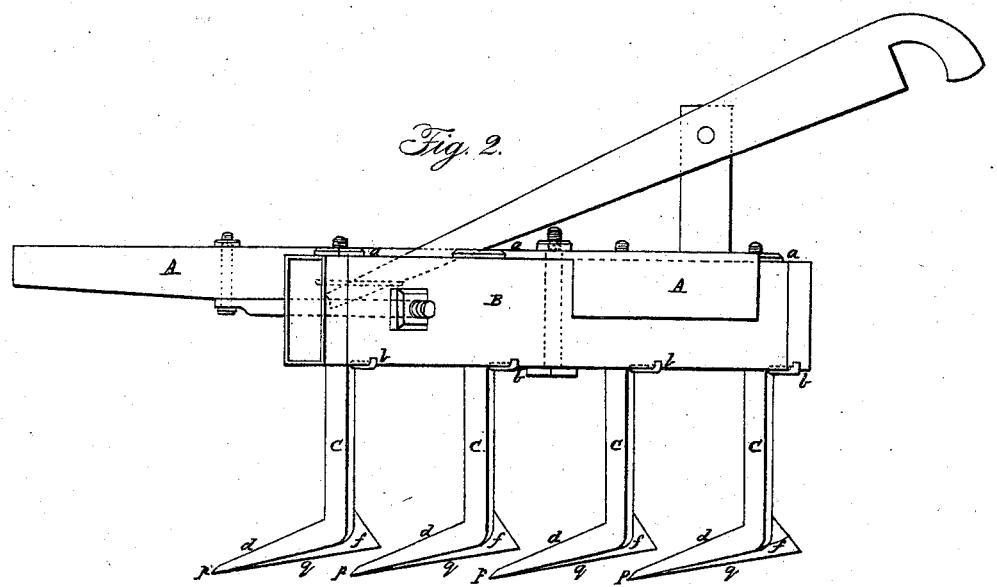

Figure 1 is a view of the harrow inverted. Fig. 2 is an elevation of the same, looking toward the rear of the oblique beam.

Similar letters of reference in the several figures denote the same part of the implement.

The nature of my invention consists in the construction on the teeth of the harrow of oblique wings, hereinafter to be described, the teeth being arranged upon a beam running obliquely to the main beam of the implement, and the other details of construction being such as will be hereinafter specified.

To enable others skilled in the art to make and use my invention, I will proceed to describe the construction and operation of the same.

In the drawings, A is the main beam of the implement, and H the handles. Running obliquely across the main beam is the beam B, suitably secured by bolts and otherwise to the said main beam. Through the beam B run the teeth C, secured to the beam by nuts $a$ and pins $b$, or in any other suitable manner. The lower extremity of each tooth C is turned up toward the front, and is armed with a wing, $f$, of a triangular shape, so placed that the side $d$ nearest the plant will, when the harrow is moving forward, incline slightly to the right and give the implement a tendency to run from the root of the plant. The surfaces of the wings incline from their junction with the teeth to their points, as shown in Fig. 2, while all the points $p$ are in the same right line, and all the cutting-edges $q$ are parallel.

The principal use of my improved harrow is in the cultivation of cotton, where the object is to pulverize the earth without hilling it up or creating furrows, while at the same time it is essential that the cutter should run as near the stalks of the plants as possible. This harrow is driven forward and guided by the operator so that the edge $d$ of the left wing shall run close to the drill. The outward obliquity of this edge prevents the running of the wing against the stalk and root and the cutting of the same. The wings run under the surface of the ground and break up and pulverize the earth without throwing it up upon the plant or removing the earth and exposing the roots. This operation cuts up the grass and weeds and renders all the service of ordinary scrapers and cultivators without the detrimental effects which pertain to their operation. The position of the wings on the side of the teeth most remote from the drill is of the greatest importance, as it enables the implement to run close to the plants without risk of cutting them, and forms, therefore, a material difference between my implement and others of a similar character.

What I claim as my invention, and desire to secure by Letters Patent, is—

The triangular wings upon the turned-up portion of the teeth C, with their land sides so inclined as to have a tendency from the plant when the implement is moving forward, constructed and arranged, substantially as hereinbefore set forth, for pulverizing the earth and otherwise facilitating the cultivation of cotton.

In testimony whereof I have hereunto signed my name before two subscribing witnesses.

JACOB MYERS.

Witnesses:
  JOHN L. SMITH,
  J. F. WOLLARD.